United States Patent [19]
Kershner et al.

[11] Patent Number: 4,824,916
[45] Date of Patent: Apr. 25, 1989

[54] WATER-INSOLUBLE, CROSSLINKED, SULFONATED AROMATIC POLYAMIDE

[75] Inventors: Larry D. Kershner; Charles E. Reineke, both of Midland, Mich.; Nitis Sarkar, Lake Jackson, Tex.; Larry R. Wilson, Midland, Mich.

[73] Assignee: The Dow Chemical Company, Midland, Mich.

[21] Appl. No.: 885,357

[22] Filed: Jul. 14, 1986

Related U.S. Application Data

[63] Continuation-in-part of Ser. No. 708,608, Mar. 15, 1985, abandoned.

[51] Int. Cl.$^4$ ............................................. C08G 69/48
[52] U.S. Cl. ........................... 525/420; 210/500.38; 522/164; 525/427; 525/428; 528/321; 528/331; 528/337; 528/348; 528/370; 528/371
[58] Field of Search .............. 528/337, 348, 321, 331; 525/420, 427, 428; 522/164

[56] References Cited

U.S. PATENT DOCUMENTS

| 2,833,744 | 5/1958 | Neher ................................ 260/77.5 |
| 3,409,596 | 11/1968 | Unger et al. ......................... 528/337 |
| 3,506,990 | 4/1970 | Richardson et al. .................. 8/172 |
| 3,567,632 | 3/1971 | Richter et al. ....................... 210/23 |
| 3,775,361 | 11/1973 | Jensen .......................... 260/32.6 NA |
| 3,839,294 | 10/1974 | Manos ............................. 260/78 SC |
| 4,162,346 | 7/1979 | Jones et al. ......................... 528/337 |
| 4,471,110 | 9/1984 | Christell ............................ 528/337 |

FOREIGN PATENT DOCUMENTS 2105735 4/1972 France .

Primary Examiner—Harold D. Anderson

[57] ABSTRACT

Novel sulfonated polyamide and polyurea materials are described. The polymers are water-soluble or water-dispersible, if not crosslinked. The polymers can be crosslinked with polyvalent cations or crosslinking agents. The polymers have utility as membranes, thickeners, coatings and adhesives.

11 Claims, No Drawings

WATER-INSOLUBLE, CROSSLINKED, SULFONATED AROMATIC POLYAMIDE

CROSS-REFERENCE TO A RELATED APPLICATION

This is a continuation-in-part of U.S. patent application Ser. No. 708,608, filed Mar. 15, 1985.

BACKGROUND OF THE INVENTION

The present invention relates to water-soluble, water-dispersible and crosslinked organic polymers bearing sulfonate groups, and in particular to polymers which contain recurring amide or urea linkages.

Water-soluble and water-dispersible polymers have proven useful in a wide variety of industrial applications. For example, such polymers are particularly useful as thickeners, flocculants and dispersants. Water-soluble and water-dispersible polymers are useful in oil field applications, such as enhanced oil recovery, well drilling, fracturing, acidizing, and the like; in mining, construction, paper manufacture, textile applications, and the like; in water based hydraulic and metalworking fluid applications; and in cosmetic, pharmaceutical, food processing, cleaning fluids, and the like.

Conventional water-soluble polymers are prepared by polymerizing water-soluble monomers such as acrylamide, sodium acrylate, and the like. The polymers are generally linear in nature and can behave as flexible coils in an aqueous solution. High molecular weight polymers generally have good thickening efficiencies. Therefore, in order for the skilled artisan to efficiently thicken aqueous fluids, it is generally necessary to employ polymers having the highest possible molecular weights. Unfortunately such polymers undergo a loss of viscosity during mechanical shear (i.e., mixing, filtering, injection, etc.) as well as experiencing a loss of desirable properties upon contact with ions in the aqueous medium, temperature changes, or other environmental conditions. Water-soluble polymers which are efficient thickeners and are capable of providing desirable properties in an aqueous medium virtually independent of temperature and salt concentration are desired.

Numerous sulfonated polyamides and polyureas are known in the art. See, for example, U.S. Pat. Nos. 3,839,294; 2,833,744; 3,567,632; 3,506,990; and 3,775,361. See, also, Silver et al., *Journal of Polymer Science, Polymer Chemistry Edition,* 17, 3519 (1979); Chauduri et al., *Journal of Polymer Science, Polymer Chemistry Edition,* 18, 2949 (1980); Vasileva et al., *Vysokomol. Soedin.,* Series A, 14, 160 (1972); German Patent No. 1,067,212; and French Patent Nos. 2,212,356; 2,105,446; and 2,050,251. The physical properties and water compatibility of such polymers in aqueous media are not generally desirable.

Polymers which are highly water-soluble or water-dispersible are referred to collectively herein as water-compatible polymers. Because of the hydrophilic nature of these polymers, water generally permeates quickly through the polymers. Such polymers would be useful as pervaporation membranes, if the polymers could be treated so the material would maintain its integrity in the presence of liquid water.

SUMMARY OF THE INVENTION

The present invention is, in one aspect, polymer comprising recurring units of the formula I:

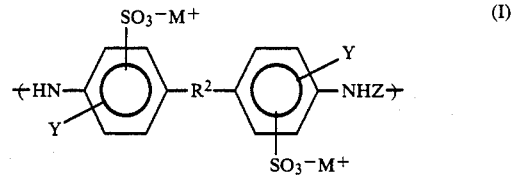

wherein $R^2$ is independently at each occurrence a hydrocarbylene or inertly substituted hydrocarbylene, or a covalent bond, Y is independently at each occurrence hydrogen, a hydrocarbyl, inertly substituted hydrocarbyl substituent or a hydrocarbylene moiety with a second valence attached to a second polymeric moiety, $M^+$ is independently at each occurrence a compatible cation and Z is independently at each occurrence is

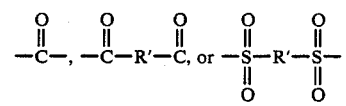

wherein $R'$ is a hydrocarbylene or an inertly substituted hydrocarbylene.

These polymers will generally be watercompatible unless crosslinked. The term "recurring units" is intended to denote that a plurality of such units will be present, but does not exclude other moieties which may be present in the polymer. The term "compatible cation" refers to cations which do not deleteriously affect the properties of the polymer. These cations can affect the solubility of the polymer in water.

In another aspect, the invention is a membrane having a discriminating layer comprising a polymer having recurring units corresponding to Formula I. Preferably, the polymer has been crosslinked to render it substantially water-insoluble. The process of making such a membrane by forming or casting the polymer on a microporous substrate and then crosslinking the polymer to render it substantially water-insoluble is another aspect of this invention.

In yet another aspect, the present invention is an interfacial polymerization process for preparing the polymers of Formula I. The process comprises interfacial polymerization of a polyacid equivalent with a diamine of Formula II

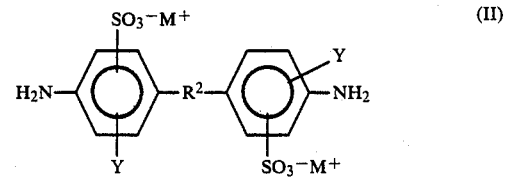

in the presence of a functionally effective amount of a surfactant.

Polymers of this invention can be employed in a wide variety of applications. Water-soluble polymers of this invention can exhibit a rigid structure and are efficient thickeners, exhibit improved resistance to shear degradation and desirable rheological properties. Crosslinked polymers can be used as water absorbents and membranes for pervaporation, gas separation and solvent dehydration.

DETAILED DESCRIPTION OF THE INVENTION

For purposes of this invention, the term "hydrocarbylene" is meant to include a hydrocarbon divalent radical including aliphatic and/or aromatic hydrocarbon diradicals. The term hydrocarbyl is similar in structure to a hydrocarbylene, but is monovalent.

By the term "inertly substituted" is meant that the moiety has one or more substituents which are inert in the condensation reaction which is employed to prepare the polymer. These substituents can be crosslinking groups which substantially decrease the solubility of the resulting polymer. Inert substituents can include groups linking hydrocarbon radicals together, such as,

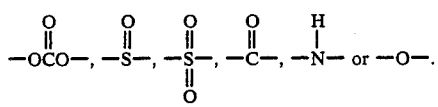

Preferred inertly substituted moieties include hydrogen, hydroxyl, alkenyl, lower alkyl moieties, such as $C_1$–$C_4$ alkyl, anionic moieties, such as carboxylate or sulfonate groups, and halogen moieties, such as chloro or bromo.

Hydrocarbylene units can include, for example, aromatic groups such as phenylene, biphenylene, naphthenylene, anthracenylene, and the like. Alternatively, hydrocarbylene units can include alkylene or alkylidene units such as methylene, ethylene, ethylidene, propylene, propylidene, isopropylidene, butylene, butylidene, isobutylidene, amylene, isoamylene, isoamylidene; or cycloalkylene such as cyclopentylene, cyclohexylene; and the like. Examples of suitable hydrocarbylene units include isopropylene, phenylene and 2,2-bis-(4-phenyl)-propane. Also included as suitable hydrocarbylene units are those units having an ar-, ar'-divalent trityl nucleus of the type disclosed in U.S. Pat. No. 4,388,455 at column 3, lines 24–53. Preferably, R' is p-phenylene or m-phenylene.

The water-soluble or water-dispersible sulfonated polyamides and polyureas of this invention are advantageously prepared by either solution or interfacial polymerization processes. Representative solution and interfacial processes for the preparation of polyamides and polyureas by the reaction of a diamine with a diacid halide and/or phosgene are described in U.S. Pat. Nos. 2,833,744; 3,506,990; 3,775,361; and Chaduri et al., *Journal of Polymer Science, Polymer Chemistry Ed.*, vol. 18, p 2949 (1980); which are incorporated herein by reference. These prior art processes can be adapted to the preparation of the polymers of this invention by employing a suitable surfactant in a functionally effective amount in order to increase the solubility of reactants in a suitable solvent.

The diamines of Formula II are generally known in the prior art. Preferably, Y is a hydrogen at each occurrence and $R^2$ is a covalent bond. Such diamines can be conveniently prepared in accordance with the procedure described in Japanese Kokai No. 74 43,944. Polyamines of higher functionality than Z can also be employed to provide crosslinks, but are generally not desirable.

The diacid halides of carboxylic acids or sulfonic acids that are suitably employed include both the acid halides of the aromatic and the saturated aliphatic dibasic acids. The saturated aliphatic dibasic acids which can be employed are derived from straight chain paraffin hydrocarbons such as oxalic, malonic, dimethyl malonic, succinic, glutaric, adipic, pimelic, suberic, azelaic and sebacic acid as well as the halogen substituted aliphatic dibasic acids. The aliphatic carboxylic acids containing heteroatoms in their aliphatic chain, such as thio-diglycollic or diglycollic acid can also be used as well as unsaturated diacids such as maleic or fumaric. Examples of aromatic and aliphatic aromatic dicarboxylic acids which can be employed in their acid chloride form are phthalic, isophthalic, terephthalic, homophthalic, ortho-, meta- and para-phenylenediacetic acid; the polynuclear aromatic acids such as diphenic acid, 1,4-naphthalic acid and 2,6-naphthalic acid. Of the foregoing diacid halides, preferred are isophthaloyl chloride, terephthaloyl chloride, as well as mixtures thereof. Optionally, trimesoyl chloride or some other polyacid halide can be employed to induce crosslinking. Preferably, the diacid halides comprise at least about 99 percent of the acid halide moieties present because of the viscosity and low solubility of the product if more crosslinking agent is employed. The preferred isophthaloyl and terephthaloyl halides are prepared by reacting the desired isophthalic acid or terephthalic acid with thionyl chloride or other thionyl halide in aromatic solvent under conditions such as those described in *High Polymers*, Vol. XXVII, "Condensation Monomers," J. K. Stille and T. W. Campbell, editors, pages 509–514, Wiley-Interscience, 1972.

The carbonate precursor employed is suitably a carbonyl dihalide, a haloformate or other compound which will suitably react with terminal amino groups to form urea or carbamate linkages. The carbonyl halides which may be employed are carbonyl bromide, carbonyl chloride (phosgene) and mixtures thereof. Suitable haloformates include bishaloformates of dihydric phenols such as bischloroformates of hydroquinone or glycols such as bishaloformates of ethylene glycol, neopentyl glycol, polyethylene glycol and the like. Of the foregoing carbonate precursors, phosgene is preferred.

Continuous addition of both a carbonate precursor and diacid halide to a reaction medium containing a diamine of Formula II can be used to prepare a polymer containing both sulfonated polyamide and sulfonated polyurea groups. Polymers with particular properties can be prepared by tailoring the ratio and sequence of the polyamide and polyurea groups.

Typical interfacial polymerization reactions are performed at about 0° C. to about 50° C., with about 20° C. to about 30° C. being preferred. The reactant ratio can range from about 0.9 to about 1.2, with essentially equimolar amounts of reactants being preferred. The organic/aqueous phase ratio typically ranges from about 0.5 to about 2. Furthermore, for example, typical solution polymerization reactions are performed at about 0° C. to about 80° C., preferably at about 20° C. to about 30° C. The reactant ratio can range from about 0.9 to about 1.2, with essentially equimolar amounts of reactants being preferred. An excess of phosgene is advantageous over the stoichiometric amounts. Polymers which are obtained can be isolated in water and purified using a wide variety of known techniques.

Various surfactants can be employed in order to enhance the solubility and hence reactivity of the monomeric materials during the polymerization reaction in the aforementioned interfacial polymerization method. Surfactants which are employed in an interfacial polymerization process allows for the preparation of high viscosity water-soluble or water-dispersible polymers in relatively high yields. A wide range of ionic and nonionic surfactants can be employed in order to provide a polymer product having a high viscosity at a low polymer concentration. Nonionic surfactants are particularly desirable and include the polyethylene oxy/polypropylene oxy surfactants, the polyethylene oxy/hydrocarbon surfactants, the polyethylene oxy/polypropylene oxy/polyethylene oxy surfactants, and the like. Examples of other operable nonionic surfactants include sorbitan monolaurate, sorbitan monooleate, sorbitan monosterate, ethylene glycol disterate, diethylene glycol dioleate, polyethylene glycol diisosterates, polyethylene glycol ethers or secondary alcohols, and the like. The preferred nonionic surfactant is a polyethylene glycol diisosterate having a polyoxyethylene group molecular weight above 150.

Operable solvents include those solvents in which the starting materials are soluble and the polymer product is either soluble or essentially insoluble. Representative solvents include common solvents such a toluene, carbon tetrachloride, benzene, acetone, ethylene chloride, and the like. Most preferably, the solvent includes a mixture of common solvent(s) with N,N-dimethylacetamide, or other solvents generically represented as polar and aprotic. It is believed that solvents such as N,N-dimethylacetamide provide polymers having high molecular weights at an acceptably high rate.

Illustrative polyamides of this invention contain repeating units such as:

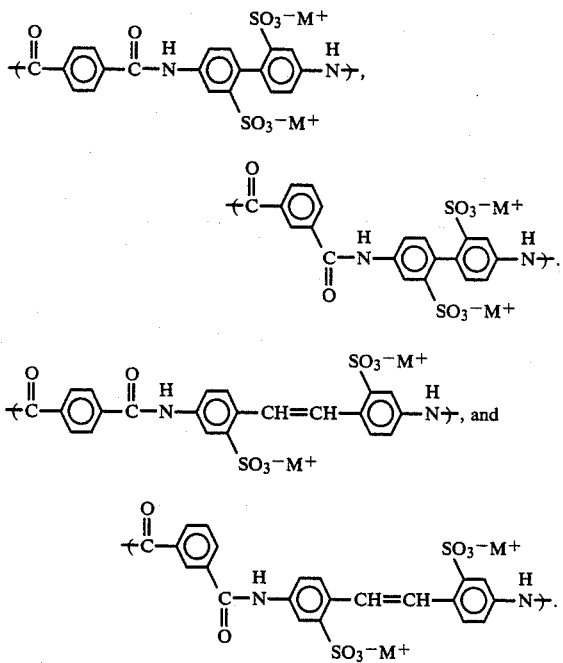

Illustrative polyureas of this invention contain repeating units such as:

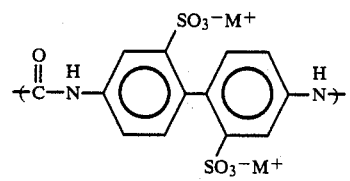

and

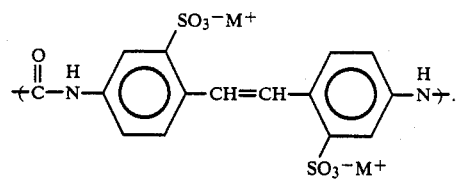

Especially preferred are polyamides and polyureas of Formula I, wherein Y is hydrogen and $R^2$ is a chemical bond. Preferably, the sulfonate groups are in positions meta to the amide or amine group. Polyurea homopolymers are more preferred.

The uncrosslinked polymers of this invention are water-soluble or water-dispersible to the extent that they form thermodynamically stable solutions or dispersions with water containing at least about 1 weight percent polymer at 0° C. The mixture forms spontaneously and includes true solutions in which individual polymer molecules are dispersed as well as micellar or colloidal solutions wherein the polymer molecules are aggregated to some extent, but wherein such aggregates are no larger than colloidal size. Preferred polymers of this invention are soluble in a concentration of at least about 15 weight percent in water.

Molecular weights of the polymers can vary and typically depend upon the application for which the polymer is prepared. Generally, molecular weights for uncrosslinked polymers range from about 50,000 to about 200,000, preferably from about 80,000 to about 150,000.

The sulfonated polyamides and polyureas of this invention differ from prior art polymers in their high degree of substitution with anionic groups. This high degree of substitution renders the polymers water-compatible unless crosslinked. Preferably, the polymer bears at least about 25 weight percent of $-SO_3H$ equivalents in the anionic form, more preferably at least about 30 weight percent of $-SO_3H$ equivalents.

The polymer can optionally include other units than those corresponding to Formula I. Preferably, the polymer contains at least 50 weight percent of groups of Formula I, more preferably at least 90 weight percent. For example, the polymer can include recurring polycarbonate moieties, e.g.,

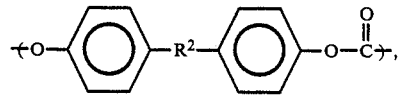

or polyester moieties, e.g.,

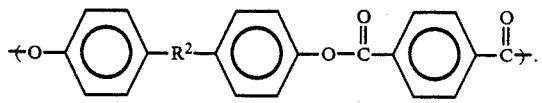

These moieties are conveniently introduced by preparing oligomers of the desired unit bearing hydroxyl or other reactive terminal groups. These oligomers can then be coreacted with the diamine, the diacid halide and/or phosgene reactants to form mixed copolymers.

Preferably, the units not corresponding to Formula I do not reduce the anionic substituents to less than the percentage of such substituents required to make the polymer water-compatible. Advantageously, the other recurring units bear carboxylate or —$SO_3^-M^+$ substituents. Preferably, the polymer bears at least about 25 weight percent anionic groups, more preferably at least about 30 weight percent of —$SO_3H$ equivalents.

The compatible cations for water-compatible polymers of this invention are conveniently ammonium or alkali metals. Preferred cations are $NH_4^+$ or $K^+$ with Na being more preferred. Ammonium groups bearing 1 to 4 hydrocarbyl substitutents are also operable. In a preferred embodiment of this invention, at least some of the cations are divalent or polyvalent cations which are ionically bonded to two —$SO_3^-$ groups. These divalent or polyvalent cations can render the polymer water-insoluble. Preferred cations include divalent or trivalent cations of iron, zinc, aluminum, copper, calcium and nickel, with barium being more preferred. Organic polymers bearing a plurality of cationic groups can also be used as ionic crosslinkers.

In a preferred embodiment of this invention, the water-compatible polymers are rendered water-insoluble by crosslinking. The crosslinking group can be a covalently bonded group or ionically bonded group. The water-compatible polymer is conveniently cast in a desired shape or film from an aqueous solution and then crosslinked. It is especially advantageous to form a prior to ionic crosslinking. Alternatively, the polymer can be interfacially polymerized on a support and then crosslinked. For example, this technique can be used to prepare a composite membrane comprising a thin film discriminating layer of a sulfonated polyamide or polyurea on a porous or microporous support.

The polymer can be crosslinked by conventional techniques and methods described hereinafter. Conventional ion exchange techniques can be used to replace alkali metal ions with divalent or trivalent cations, thereby forming ionic crosslinks. For example, a sulfonated polyurea or polyamide in film or fiber form can be converted from the sodium form to a polyvalent cation by immersion in an aqueous solution of a salt containing the cation. Conveniently, an aqueous solution containing about 2 to about 15, preferably about 5 to about 10, weight percent salt is employed. Solutions of lower salt concentration can, in some instances, cause undesirable swelling of the polymer. Solutions of higher concentration may only crosslink the polymer surface.

A polymer dispersed in water can also be cast or spun into an aqueous solution of polyvalent ions to form a polymer gel. This gel can then be treated to remove the water.

The water-compatible polymers of this invention can also be covalently crosslinked via conventional techniques and methods described hereinafter. For example, these polymers can be cured using commercial melamine formaldehyde or urea formaldehyde resins. The crosslinking reaction conveniently occurs moderately elevated temperatures (at least about 120° C., preferably at least about 160° C.). Although the preferred polymers generally exhibit excellent thermal stability even at temperatures of 300° C., some crosslinked systems may degrade at high temperatures. The cure time will depend upon the temperature and pH. A pH of less than about 4, more preferably about 3.5 to 3 is preferred. The preferred weight ratio of crosslinker to polymer varies, but a ratio of about 1:10, more preferably in the range from about 1:6 to about 1:2 is preferred.

Another covalent crosslinker which can be used are compounds bearing an average of more than one sulfonium group. For exmmple, the bis-cyclic sulfonium zwitterion of bisphenol A can be used as a crosslinker. A convenient ratio of zwitterion to polymer ratio is from 1:6 to 1:2 by weight although other ranges are operable. Moderately elevated temperatures (preferably, at least about 155° C.) are desirable to facilitate curing.

The crosslinkers are conveniently introduced to the polymer via conventional techniques such as dipping, spraying or wiping. The crosslinker should be present in a diluent or solvent which does not deleteriously affect the polymer or crosslinker. Surfactants may also be used to provide desired application properties. Some crosslinkers may be used as a gas or neat.

Another class of crosslinkers may require a catalyst or irradiation to induce crosslinking. Polymers or compounds bearing one or more photocrosslinkable groups can be employed. Illustrative groups are described in *Kirk-Othmer, Encyclopedia of Chemical Technology*, 3rd Edition, Volume 17, pages 680–708, John Wiley & Sons (1982), which is incorporated herein by reference. These cures can be achieved at ambient temperatures. The desirable ratio of crosslinker to polymer is similar to the aforementioned chemical crosslinkers. In many instances, the polymer surface contacted is crosslinked to a depth of less than about 0.005 inch.

Another type of crosslinker may involve the substituent Y on the repeating unit of Formula I. Y may represent a reactive group which can be used to crosslink the polymer. For example, Y may be vinyl, epoxide (advantageously, introduced after formation of the polymer) or a group bearing a labile hydrogen.

Whatever the type of crosslink, it is preferred that the crosslinked polymer retains a high degree of anionic substitution. Preferably, the crosslinked polymer contains at least about 25 weight percent —$SO_3H$ equivalents.

The polymers of this invention exhibit a variety of desirable properties. For example, the water-compatible polymers can be pseudoplastic in character and can exhibit high yield values (i.e., are efficient thickeners) at relatively low concentrations in the liquid medium (e.g., particularly in a saline solution) which is being thickened. Thus, such polymers can be employed in formulations which can exhibit high viscosities or yield stresses while also allowing good flow of the formulation at high shear rates. Polymers of this invention can be absorbed on a wide variety of substrates. Such polymers can exhibit liquid crystalline behavior above a critical concentration in a formulation which makes such formulations useful in providing fibers, coatings, etc. The polymers of this invention can also be cast from aqueous solutions to yield films which can be clear and strong, and can exhibit birefringence. The polymers xhibit good adhesion to a variety of substrates. Sulfonated polyamides generally show good adhesion to glass, but can be cast as films on polished stainless steel.

The ionically crosslinked polymers exhibit some unique properties. These polymers demonstrate good physical strength. They will form an adhesive bond between a variety of substrates. They are water-insoluble, but can be rendered water-soluble by ion exchange with $Na^+$ or $H^+$. These polymers also are generally hygroscopic and very permeable to water vapor.

The covalently crosslinked polymers are similar in many properties to the ionically crosslinked polymers. These polymers are generally somewhat less permeable to water. Moreover, the crosslinks are not readily reversible.

The polymers of this invention are useful in a wide variety of industrial applications. Representative applications for the polymers not crosslinked include uses in oil field applications (e.g., in enhanced oil recovery, fracturing of subterranean formations and drilling applications), construction (e.g., as thickeners for paints, cements and plaster), textiles (e.g., in sizing and antistatic agents), detergents and cosmetics, agricultural products, paper manufacture, food and pharmaceuticals, water-soluble polymer membranes and films, dispersants (e.g., for use in high solids systems, such as grinding aids), photographic gels, water-based hydraulic fluids and metalworking compositions, mining, high temperature adhesives, thickeners, flocculants of particulate materials, and the like. The uncrosslinked polymers are useful as pervaporation membranes for separation of water, so as long as the concentration of water in the feed does not deleteriously affect the polymer.

The crosslinked polymers of this invention are useful as protective coatings, adhesives and membrane discriminating layers. The polymer crosslinked with ionic bonds have special utility as a water resistant coating which can be simply treated to exchange cations and then removed with water. Other utilities for the crosslinked polymers include ion exchange materials, water-permeable garments and humidity sensing devices.

In a preferred embodiment of this invention, the crosslinked polymers are used as a membrane discriminating layer. These polymers because of their selective permeability to water are excellent pervaporation membranes for separation of water from organics or chlorinated organic materials. The polymer can be used in any of the hollow fiber, flat sheet, spiral or tubular membrane forms known in the art. The polymer can be applied to a porous support to form a thin discriminating layer in a composite structure by conventional casting techniques or methods described hereinbefore. Because of the relatively high viscosity of the preferred polymers at low concentrations, excellent continuous thin films can be formed on porous substrates. Conventional porous supports, such as polysulfone or polyethersulfone, can be used in the thin film composite membrane. Alternatively, a homogeneous film or fiber can operably be employed as the membrane or laminated to a porous support. Preferably, the discriminating layer is defect free and as thin as possible, while maintaining the desired physical integrity.

The following examples are presented to further illustrate but not limit the scope of this invention. All parts and percentages are by weight unless otherwise indicated. Permeability is reported in units of:

$$\frac{\text{cubic centimeters (at standard temperature and pressure)} \cdot \text{centimeter}}{\text{square centimeter} \cdot \text{second} \cdot \text{centimeters of Hg}}$$

Sulfonated polyurea as used in the examples refers to a polymer having repeating units corresponding to the formula:

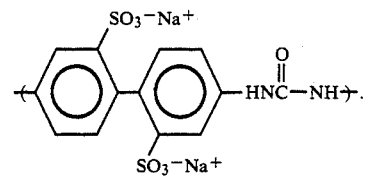

EXAMPLE 1

To 100 ml chloroform in a 1 quart Waring Blender jar is added 250 ml deionized water, 2.65 g sodium carbonate, 2.1523 g 4,4'-diaminobiphenyl-2,2'-disulfonic acid and 2 g polyethyleneglycol diisosterate surfactant which has an average molecular weight of 200. The mixture is emulsified for 30 seconds with the blender at high speed. To the emulsion is added a solution of 1.2738 g terephthaloyl chloride in 100 ml of chloroform as quickly as possible. Agitation of the mixture is continued for 15 minutes at low speed during which time the mixture becomes viscous. The agitation is ceased, the mixture is allowed to stand for 15 minutes, and 200 ml of deionized water is added to the mixture. The polymer is precipitated from 800 ml acetone, filtered and washed with methanol. The polymer is twice dissolved in 200 ml of deionized water, reprecipitated in 600 ml acetone, filtered and washed with methanol. The isolated polymer is dried at 40° C. to provide 1.7 g polymer which exhibits an intrinsic viscosity in water of 62.5 dl/g.

EXAMPLE 2

To 100 ml acetonitrile in a 1 pint Waring blender jar is added 3.444 g 4,4'-diaminobiphenyl-2,2'-disulfonic acid and 7.4 g tri-n-butylamine. The mixture is agitated with the blender at low speed and a solution of 2.038 g terephthaloylchloride in 50 ml of acetonitrile is added to the mixture in one portion. A gel-like precipitate forms immediately. An additional 100 ml of acetonitrile is added to the mixture and stirring of the thick slurry is continued for 8 minutes. The mixture is filtered, washed with acetonitrile, reslurried with acetonitrile, filtered and dried. The isolated polymer product weighs 8.5 g.

EXAMPLE 3

An emulsion of 100 ml deionized water, 40 ml chloroform and 0.8 g polyethylene glycol diisosterate surfactant having a molecular weight of 200 is prepared in a Waring Blender jar. The emulsion is placed in a stirred reactor which is maintained at 50° C. A solution of 10.332 g 4,4'-diaminobiphenyl-2,2'-disulfonic acid, 9.8 ml of an aqueous solution of 20 percent sodium hydroxide and 97.7 ml deionized water is prepared as well as a second solution of 23 g phosgene in 179 g of chloroform. Each of these two solutions is added simultaneously to the stirred reactor containing the emulsion over a period of 53 minutes. During the addition of the two solutions to the emulsion, the reaction mixture is stirred at 550 rpm and is maintained at 13° C. to 15° C. with external cooling and the pH is maintained at about 7 by addition of 20 percent sodium hydroxide solution. All of the first solution is added to the reaction mixture and enough of the second solution is added in order that a total of 4.066 g of phosgene is added to the reaction mixture. After addition of the two solutions to the reaction mixture is complete the viscosity of the reaction medium increases and 300 ml deionized water is added to the reaction medium to decrease the viscosity thereof. The pH of the medium is raised to 10 and the polymer is precipitated with 500 ml acetone, filtered and methanol washed. The polymer is redissolved in 200 ml water, precipitated with acetone, filter washed with methanol and dried to yield 7.3 g of polymer. The viscosity of a 1 percent solution of polymer in deionized water is 4 centipoise.

EXAMPLE 4

Into a reactor at 15° C. is charged with stirring 300 ml deionized water, 17.22 g 4,4'-diamino-biphenyl-2,2'-disulfonic acid and 16.6 ml of a 20 percent aqueous sodium hydroxide solution. Over a 1 hour period is added to the stirred, cooled solution via a rotometer and dip tube 14 g of phosgene. The pH of the reaction mixture is maintained at 7 by continued addition of 20 percent sodium hydroxide solution. The solution viscosity increases during the run and an additional 1800 ml of water is added during the reaction. After phosgene addition is terminated, the pH is raised to 10 and the polymer precipitated with 3 liters of acetone. The product is filtered, dissolved in 500 ml water and reprecipitated with 1 liter of acetone. This purification procedure is carried out twice and the product is dried. The polymer product weighs 3.2 g and a 1 percent solution in water has a viscosity of 9 centipoise.

EXAMPLE 5

In a manner generally similar to Example 1, except that isophthaloyl chloride was used as a reactant, poly(4,4'-2,2'-disulfobiphenylene isophthalamide) sodium salt was prepared. The polymer was 34 percent —$SO_3H$ equivalents by weight. A sample of 0.8 gram (g) of polymer was dissolved in 70 milliliters (ml) deionized water. The solution was filtered, applied as a thin film to a glass plate and dried at 40° C. for 2 hours. The resulting film was tough, clear, water-soluble and had an average thickness of 6 mils.

EXAMPLES 6 AND 7

In a manner generally similar to Example 5, homogeneous films were prepared from the polymers described in Examples 1 and 3 in the sodium salt form. Each film was placed in an apparatus with a vaccum on one side of the film and a 90/10 mixture of ethanol/water on the opposite side. The total permeation rate through each film in (g-mil)/(square meter-hour) was determined. The selectivity was also calculated as:

$$\alpha = \frac{(wt. H_2O/wt. C_2H_5OH) \text{ in permeate}}{(wt. H_2O/wt. C_2H_5OH) \text{ in feed}}.$$

The results are tabulated in Table I.

TABLE I

| Example | Membrane From Example | Selectivity | Permeation Rate |
|---|---|---|---|
| 6 | 1 | 60 | 100 |
| 7 | 3 | >700 | 237 |

The data in Table I confirms that sulfonated polyurea and polyamides can be used as membranes to separate water from ethanol via pervaporation.

EXAMPLES 8 AND 9

The polymers from Examples 1 and 5 in the sodium salt form were cast as films. These films were then tested at 60 percent relative humidity and 25° C. to measure separately the moisture vapor transmission rate and oxygen transmission rate through the membrane with a vacuum on the other side. The permeability for water and oxygen for each film is tabulated in Table II.

TABLE II

| Example | Membrane From Example | Permeability × $10^{10}$ $H_2O$ | Permeability × $10^{10}$ $O_2$ |
|---|---|---|---|
| 8 | 1 | 37,070 | 0.026 |
| 9 | 5 | 122,550 | 0.038 |

Examples 8 and 9 suggest the polymers of this invention can be used as membranes to dehydrate air.

EXAMPLES 10 AND 11

The polymers from Examples 3 and 5 in the sodium salts form were cast as films. These films were then tested at 30° C. and 29 percent relative humidity in methane with a vacuum on the other side. The permeability is reported in Table III for each film.

TABLE III

| Example | Membrane From Example | Permeability × $10^{10}$ $H_2O$ | Permeability × $10^{10}$ $CH_4$ |
|---|---|---|---|
| 10 | 3 | 80,000 | 0.50 |
| 11 | 5 | 24,000 | 0.08 |

Examples 10 and 11 suggest that the polymers of this invention can be used as membranes to dehydrate methane.

EXAMPLE 12

An ~½ inch×½ inch×0.001 inch film of sulfonated polyurea was immersed in 20 ml of a 5 percent solids aqueous solution of $MgCl_2$ for 5 minutes at 23° C. The film was then removed and placed in 100 ml of deionized water at 23° C. for 30 minutes. The film was observed to be water-insoluble.

EXAMPLE 13

In a manner similar to Example 12, a sulfonated polyurea film was immersed in a 5.3 percent aqueous solution of $Al_2(SO_4)_3$. The resulting film was insoluble in deionized water.

EXAMPLE 14

A sulfonated polyurea was immersed in a 10 percent solids $CuSO_4$ solution. Over a period of 10 minutes the film was observed to change from clear to a translucent blue-green. The film was then placed in deionized water and there was no change in its appearance, indicating that the color was due to ionicly bound $Cu^{+2}$ ions. The film was then placed in 10 percent NaCl and the color was observed to dissipate over a 10 minute period as the large excess of $Na^+$ ions caused a displacement of the bound $Cu^2$ ions. The film was then placed in deionized water and immediately began to dissolve.

EXAMPLE 15

In a manner otherwise similar to Example 12, a sulfonated polyurea film was immersed in an aqueous solution of 10 percent $CaCl_2$ for 15 minutes. The film was rinsed in deionized water and immersed in tap water. There was no visible change in the film after hours.

EXAMPLE 16

An aqueous solution containing sulfonated polyurea and a bis-cyclic sulfonium zwitterion of bisphenol A in a weight ratio of 2.5 to 1 and 6 weight percent total solids was prepared. The formula of the zwitterion corresponded to:

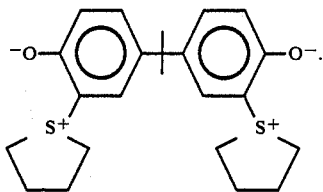

A 0.08 inch thick film of the solution was cast on a pyrex plate and placed in a 80° C. oven to dry for 1 hour and then cured at 160° C. for 1 hour. The resulting 0.003 inch film was found to be water-insoluble.

EXAMPLE 17

A 2 weight percent total solids aqueous solution of sulfonated polyurea with Cymel ® 303 resin at a weight ratio of 4 to 1 was prepared. Cymel ® 303 resin is a hexamethoxymethyl melamine resin available from the American Cyanamid Company. The pH of the solution was dropped to 3 by the addition of 0.1N. HCl. A film was cast as in Example 16, dried at 90° C. for ½ hour and then cured at 180° C. for 1½ hours. The resulting film was found to be water-insoluble.

EXAMPLE 18

A 6 weight percent total solids solution of sulfonated polyurea with Beetle ® 65 resin at a weight ratio of 4:1 was prepared. The resin is a methoxylated urea formaldehyde resin available from the American Cyanamid Company. The solution pH was lowered to 3 by the addition of 0.1N. HCl and a film was cast as in Example 16. The casting was dried at 50° C. for 2 hours and then cured at 180° C. for 2 hours to yield a water-insoluble film.

EXAMPLE 19

A three-inch square sheet of Millipore PTGC ultrafiltration membrane was taped onto a glass plate using adhesive tape of 5 mil thickness. A second layer of similar tape was added to the first to serve as a spacer. A bead of 1 percent solution of sulfonated polyurea in water was placed along one edge of the support membrane. This solution was then drawn across the support membrane using a No. 6 wire wound rod. The resulting solution cast film was allowed to air dry.

The resulting composite membrane was placed in a permeation apparatus. A stream of 90 percent relative humidity nitrogen at atmospheric pressure was flowed across the coated side of the membrane. The permeate (porous) side of the membrane was connected to a vacuum chamber. The contents of the vacuum chamber were monitored as a function of time by the mass spectrometer to determine permeation rates. Three separate samples were evaluated. The resulting average permeances (permeability divided by membrane thickness) for water vapor was $1.1 \times 10^{-2}$ and for nitrogen was $1.9 \times 10^{-6}$.

EXAMPLE 20

In a manner generally similar to Example 19, a 6.66 percent solution of sulfonated polyurea in water was solution coated onto a Millipore PTGC ultrafiltration membrane. The resulting permeances for water and nitrogen were $9.3 \times 10^{-3}$ and $1.0 \times 10^{-6}$, respectively. These results were based on average permeances of three samples.

EXAMPLE 21

In a manner generally similar to Example 19, a 1.0 percent solution of sulfonated polyurea in water was solution coated onto a porous polysulfone support sold by FilmTec Corporation under the designation UF-10. The resulting permeances for water and nitrogen were $4.6 \times 10^{-3}$ and $2.7 \times 10^{-6}$, respectively. These results were based on average permeances of three samples.

EXAMPLE 22

In a manner generally similar to Example 19, a 6.66 percent solution of sulfonated polyurea in water was solution coated onto a FilmTec UF-10 porous support. The resulting permeances for water and nitrogen were $3.7 \times 10^{-3}$ and $2.1 \times 10^{-6}$, respectively. These results were based on average permeances of two samples.

In Examples 19–22, the water vapor flux was generally limited by the substrate and not the discriminating layer.

What is claimed is:

1. A polymer comprising recurring units corresponding to Formula I:

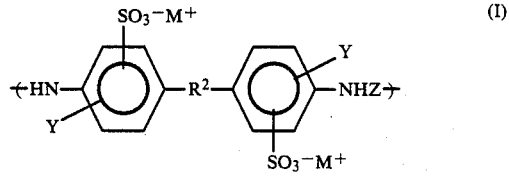

wherein y, at each occurrence, is independently a compatible substituent, $M^+$, at each occurrence, is a compatible cation, $R^2$ at each occurrence is a covalent bond, or $R^2$ is hydrocarbylene or inertly substituted hydrocarylene; and Z at each occurrence is independently

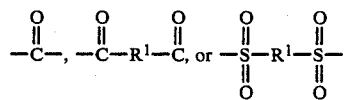

and $R^1$ at each occurrence is independently hydrocarbylene or an inertly substituted hydrocarbylene, wherein the ploymer comprises an effective number of crosslinking groups so as to render the polymer normally insoluble in water and wherein the polymer would be water-soluble or water dispersible to the extent of at least about 1 weight percent polymer at 20° C., if the polymer were not crosslinked.

2. The polymer as described in claim 1 wherein the polymer bears at least about 25 percent of —SO₃H equivalents by weight.

3. The polymer as described in claim 1 wherein Z is $$-\overset{O}{\overset{\|}{C}}-R'-\overset{O}{\overset{\|}{C}}-$$

and R' is an aromatic hydrocarbylene.

4. The polymer as described in claim 1 wherein M+ is Na+.

5. The polymer as described in claim 1 wherein Y is hydrogen and R² is a covalent bond.

6. The polymer as described in claim 1 wherein the crosslinking groups are polyvalent cations.

7. The polymer as described in claim 6 wherein the polyvalent cations are Ba++.

8. The polymer of claim 1 comprising recurring units of the formula:

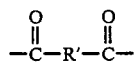

9. The polymer of claim 1 wherein the sulfonate groups are in positions meta relative to the amide or amine groups in the polymer backbone.

10. The polymer of claim 1 wherein the polymer of this invention prior to crosslinking is soluble in a concentration of at least 15 weight percent in water.

11. The polymer of claim 1 wherein the polymer bears at least about 30 percent —SO₃H equivalents by weight.

* * * * *